(12) United States Patent
Tracy et al.

(10) Patent No.: US 7,814,865 B2
(45) Date of Patent: Oct. 19, 2010

(54) DEVICE FOR TRAINING AND LOCATING AN ANIMAL

(75) Inventors: Lance Tracy, Oak Ridge, TN (US); Greg Gillis, Escondido, CA (US)

(73) Assignee: Radio Sysetms Corporation, Knoxville, TN (US)

( * ) Notice: Subject to any disclaimer, the term of this patent is extended or adjusted under 35 U.S.C. 154(b) by 781 days.

(21) Appl. No.: 11/669,914

(22) Filed: Jan. 31, 2007

(65) Prior Publication Data

US 2008/0178824 A1 Jul. 31, 2008

(51) Int. Cl.
*A01K 15/02* (2006.01)
(52) U.S. Cl. ........................... 119/720; 119/859
(58) Field of Classification Search .................. 119/720, 119/859, 718, 719, 721, 908; 340/573.3
See application file for complete search history.

(56) References Cited

U.S. PATENT DOCUMENTS

| | | | | |
|---|---|---|---|---|
| 5,351,653 A | * | 10/1994 | Marischen et al. | 119/719 |
| 5,815,077 A | * | 9/1998 | Christiansen | 340/573.3 |
| 6,151,276 A | * | 11/2000 | Peinetti | 367/139 |
| 6,170,439 B1 | | 1/2001 | Duncan et al. | |
| 6,581,546 B1 | * | 6/2003 | Dalland et al. | 119/712 |
| 6,700,492 B2 | * | 3/2004 | Touchton et al. | 340/573.1 |
| 6,750,758 B2 | | 6/2004 | Duncan et al. | |
| 6,874,447 B1 | | 4/2005 | Kobett | |
| 6,923,146 B2 | * | 8/2005 | Kobitz et al. | 119/721 |
| 7,328,671 B2 | * | 2/2008 | Kates | 119/720 |
| 2006/0027185 A1 | * | 2/2006 | Troxler | 119/721 |
| 2008/0272908 A1 | * | 11/2008 | Boyd | 340/539.13 |
| 2009/0031966 A1 | * | 2/2009 | Kates | 119/719 |

* cited by examiner

*Primary Examiner*—Yvonne R. Abbott
(74) *Attorney, Agent, or Firm*—Pitts & Brittian, P.C.

(57) ABSTRACT

Described is an animal training/locating device including an animal training feature, an animal locating feature, and a transmitting device for communicating with the animal training feature and the animal locating feature independently. The training device and the locator device are secured to a carrying strap that is secured to the animal such that the training device and the locator device are carried by the animal. The training device is adapted to receive a training signal and the locator device is adapted to receive a locator signal. The transmitting device transmits the training signal and the locator signal. Whether the transmitting device transmits the training signal or the locator signal is governed by the trainer. Consequently, the trainer, by way of the transmitting device, communicates with the training device and the locator device independently.

6 Claims, 5 Drawing Sheets

DEVICE FOR TRAINING AND LOCATING AN ANIMAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to a device for training and locating an animal. More particularly, this invention pertains to a device that includes an animal training feature and an animal locating feature and that enables a trainer to communicate with the animal training feature and the animal locating feature independently by way of a single transmitting device.

2. Description of the Related Art

Under particular circumstances, an animal trainer needs a device that provides the trainer with information regarding the location of the animal and with the ability to deliver a stimulus to an animal. An example of such particular circumstances arises when the trainer is training a sporting dog. A sporting dog's tasks include locating, chasing, retrieving, and otherwise shepherding game in accordance with the trainer's commands. To perform these tasks, the sporting dog must work outside of the trainer's line-of-sight. When the sporting dog is out of the trainer's line-of-sight, the trainer maintains knowledge of the sporting dog's location by way of a locator device. Consequently, to train a sporting dog to perform properly when the dog is out of the trainer's line-of-sight, the trainer requires a locator device and a stimulus device for delivering a stimulus to the sporting dog when it exhibits undesirable behavior.

Conventional devices approach the discussed requirement by securing a locator device and a stimulus device to a conventional pet collar. The locator device typically emits an audible signal to indicate the location of the animal. The stimulus device typically delivers a correction stimulus to the animal. Typically, the locator device is disposed at the top of the collar such that the audible signal emitted by the locator device is transmitted up and away from the dog, providing optimum signal range. To maintain the locator device at the top of the collar, the stimulus device is disposed at the bottom of the collar to serve as a counterweight. The stimulus device includes a receiver adapted to receive a wireless correction signal, which is transmitted by a transmitting device held by the trainer. The stimulus device is responsive to the correction signal such that the stimulus device delivers a correction stimulus to the animal upon receiving the correction signal. Conventionally, the stimulus device is in communication with the locator device either by way of electrical communication, such as facilitated by electrical wires running from the stimulus device to the locator device, or by way of wireless communication, such as facilitated by magnetic signals transmitted by the stimulus device and received by the locator device. Consequently, in addition to being adapted to receive the correction signal, the receiver of the stimulus device is adapted to receive a wireless locator signal, which is transmitted by the transmitter device held by the trainer. The stimulus device is responsive to the locator signal such that the stimulus device transmits the locator signal to the locator device upon receiving the locator signal. The locator signal governs the operation of the locator device, such as activating and deactivating the locator device.

While the above discussed conventional device enables a trainer to train and locate an animal, it is limited in that communication between the transmitting device and the locator device requires two transmissions, namely from the transmitting device held by the trainer to the stimulus device and from the stimulus device to the locator device. When the second transmission (the transmission from the stimulus device to the locator device) is facilitated by electrical wiring, the wiring is disposed along the collar between the stimulus device and the locator device. Because of the vigorous activity engaged in by, for example, a sporting dog and the rugged surrounding environment of the sporting field, the wiring is subject to being damaged or dislodged. When the wiring becomes damaged or dislodged, the trainer is not able to communicate with the locator device, which means the trainer loses information regarding the location of the sporting dog. This loss of information potentially results in injury to the sporting dog. Alternatively, when the second transmission is facilitated by magnetic signals, the stimulus device transmits the wireless locator signal to the locator device. Because the stimulus device must first receive the locator signal from the transmitting device and then retransmit the locator signal to the locator device, an unnecessary delay is presented. This unnecessary delay in transmission translates to an unnecessary delay in the communication of information regarding the sporting dog. This delay in communication of information potentially results in injury to the sporting dog. Consequently, a device that includes a training feature and a locating feature and that enables a trainer to communicate with the training feature and the locating feature independently through a single remote transmitting device is desired.

BRIEF SUMMARY OF THE INVENTION

In accordance with the various features of the present invention there is provided an animal training/locating device including an animal training feature, an animal locating feature, and a transmitting device for communicating with the animal training feature and the animal locating feature independently. The animal training/locating device includes a training device, a locator device, and a transmitting device. The training device and the locator device are secured to a carrying strap that is secured to the animal such that the training device and the locator device are carried by the animal. The training device is adapted to receive a training signal and to deliver a stimulus to the animal in response to receiving the training signal. The locator device transmits a position indicating signal, such as an audible signal or a radio signal, indicating the location of the animal. The locator device is adapted to receive a locator signal and to alter the current mode of operation of the locator device in response to receiving the locator signal. The transmitting device is operated by a trainer and transmits the training signal and the locator signal. Whether the transmitting device transmits the training signal or the locator signal is governed by the trainer. Consequently, the trainer, by way of the transmitting device, communicates with the training device and the locator device independently.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 1:
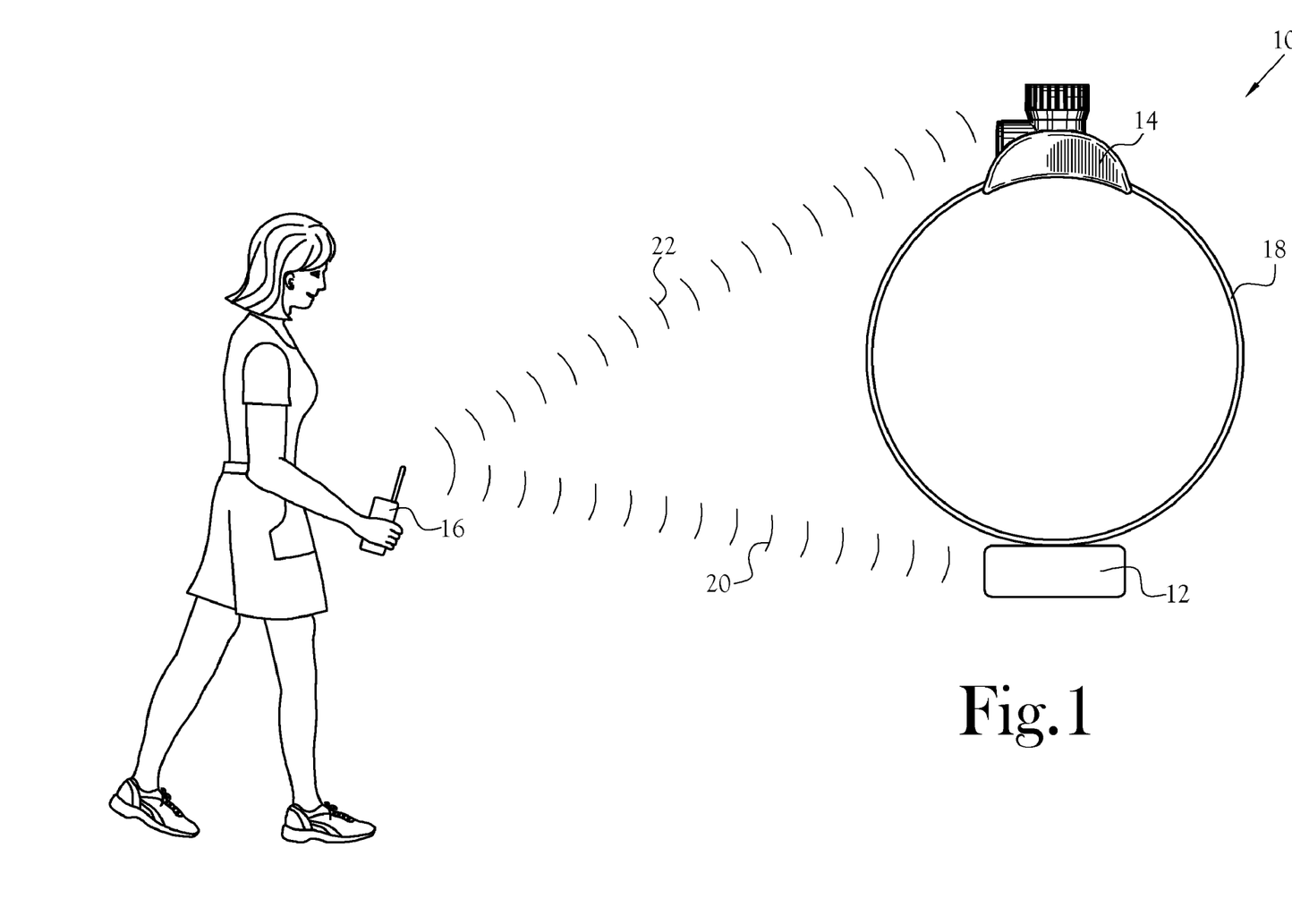
FIG. 1 illustrates one embodiment of the animal training/locating device in accordance with the various features of the present invention.

One embodiment of an animal training/locating device including an animal training feature, an animal locating feature, and a transmitting device for communicating with the animal training feature and the animal locating feature independently and constructed in accordance with the various features of the present invention is illustrated generally at 10 in FIG. 1. The animal training/locating device 10 includes a training device, a locator device, and a transmitting device. The training device and the locator device are secured to a carrying strap that is secured to the animal such that the training device and the locator device are carried by the animal. The training device receives a training signal and delivers a stimulus to the animal in response to receiving the training signal. The locator device transmits a position indicating signal, such as an audible signal or a radio signal, indicating the location of the animal. The locator device receives a locator signal and alters the current mode of operation of the locator device in response to receiving the locator signal. The transmitting device is operated by the trainer and transmits the training signal and the locator signal. Whether the transmitting device transmits the training signal or the locator signal is governed by the trainer. Consequently, the trainer, by way of the transmitting device, communicates with the training device and the locator device independently.

FIG. 1 illustrates one embodiment of the animal training/locating device 10 in accordance with the various features of the present invention. The animal training/locating device 10 includes a training device 12, a locator device 14, and a transmitting device 16. The training device 12 and the locator device 14 are carried by an animal. More specifically, in the illustrated embodiment, the training device 12 and the locator device 14 are secured to a carrying strap 18, such as a pet collar, such that when the carrying strap 18 is secured to the animal, the animal carries the training device 12 and the locator device 14. The training device 12 is adapted to deliver a stimulus to the animal. The stimulus delivered by the training device 12 is to deter unacceptable behavior and/or to encourage desired behavior. The training device 12 is also adapted to receive a training signal 20 such that when the training device 12 receives the training signal 20, it delivers the stimulus to the animal. It should be noted that the stimulus delivered by the training device 12 includes any stimulus, such as an electrical stimulus, a vibration stimulus, an auditory stimulus, or a visual stimulus, without departing from the scope or spirit of the present invention.

The locator device 14 transmits a position indicating signal, such as an auditory signal or a radio signal, to indicate the location of the animal. Additionally, the locator device 14 is adapted to receive a locator signal 22 and to alter a mode of operation of the locator device 14 in response to receiving the locator signal 22. In one embodiment, when the locator device 14 receives the locator signal 22, it alters the activation status of the location device 14, namely whether the location device 14 is transmitting the position indicating signal. More specifically, when the locator device 14 is deactivated and it receives the locator signal 22, the locator device 14 becomes activated. Conversely, when the locator device 14 is activated and it receives the locator signal 22, the locator device 14 becomes deactivated. In other words, the locator signal 22 turns the location device 14 on and off. Those skilled in the art will recognize that the locator device 14 can respond to receiving the locator signal 22 by altering a mode of operation other than the activation status of the location device 14 without departing from the scope or spirit of the present invention. For example, the locator device 14 can respond to receiving the locator signal 22 by altering the type of the position indicating signal, the various types of the position indicating signal including a radio signal, an auditory signal, a beep, and a hawk screech. Additionally, the locator device 14 can respond to receiving the locator signal 22 by altering various characteristics of the transmission of the position indicating signal. More specifically, the locator device 14 can alter the frequency, duration, and volume at which the position indicating signal is transmitted.

Figures 2, 3:
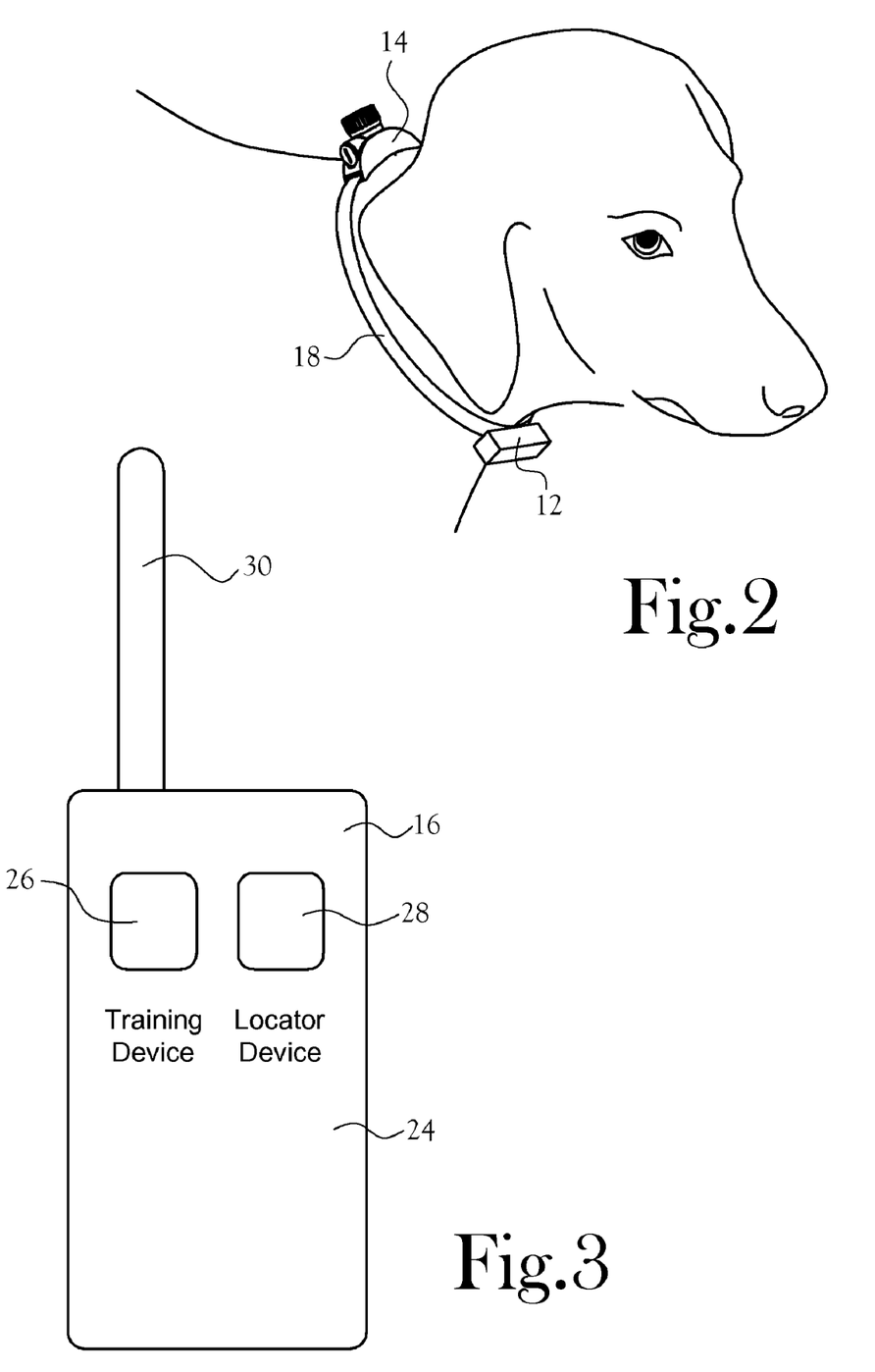
FIG. 2 illustrates the animal training/locating device of FIG. 1 secured to an animal in accordance with the various features of the present invention.
FIG. 3 illustrates the transmitting device of the animal training/locating device of FIG. 1.

In the illustrated embodiment, the training device 12 is secured to the carrying strap 18 such that it is opposite the locator device 14 with respect to the animal's neck. More specifically, when the carrying strap 18 is secured to the animal, the locator device 14 is situated at the top of the animal's neck and the training device 12 is situated at the animal's throat, as depicted in FIG. 2. The locator device 14 is situated at the top of the animal's neck such that the position indicating signal transmitted by the locator device 14 is transmitted up and away from the animal. Transmitting the position indicating signal up and away from the animal maximizes the transmission range of the position indicating signal. For example, if the locator device 14 was not situated at the top of the animal's neck, the animal's body would impede the transmitted position indicating signal. The training device 12 is situated at the animal's throat to serve as a counterweight for maintaining the position of the locator device 14 at the top of the animal's neck. It should be noted that various arrangements of the training device 12 and the locator device 14 along the carrying strap 18 other than the illustrated arrangement of the training device 12 being opposite the locator device 14 are achievable without departing from the scope or spirit of the present invention.

The training device 12 and the locator device 14 are of a blaze orange hue, a color of high visibility in the sporting field. Because the training device 12 and the locator device 14 are of a blaze orange hue, when the training device 12 and the locator device 14 are no longer carried by the animal, the trainer is able to locate and retrieve the training device 12 and the locator device 14 because the color of the devices greatly contrasts the colors of the surrounding environment. The training device 12 and the locator device 14 are no longer carried by the animal when the carrying strap 18 breaks or is otherwise displaced from the animal. Additionally, the training device 12 and the locator device 14 are no longer carried by the animal when the devices become displaced from the carrying strap 18. Those skilled in the art will recognize that the training device 12 and the locator device 14 can be a highly visible color other than blaze orange, such as another hue of orange, without departing from the scope or spirit of the present invention.

FIG. 3 illustrates one embodiment of the transmitting device 16 in accordance with the various features of the present invention. In the illustrated embodiment, the transmitting device 16 includes a housing 24, a training device button 26, a locator device button 28, and an antenna 30. The housing 24 is of a blaze orange hue. Because the housing 24 is of a blaze orange hue, a highly visible color, when the trainer drops the transmitting device 16 while in the sporting field, the trainer is able to locate and retrieve the transmitting device 16 because the color of the housing 24 greatly contrasts the colors of the surrounding environment. Those skilled in the art will recognize that the housing 24 can be of a highly visible color other than blaze orange, such as another hue of orange, without departing from the scope or spirit of the present invention.

The transmitting device 16 is in communication with the training device 12 and the locator device 14. More specifically, the transmitting device 16 transmits the training signal 20, which is received by the training device 12, and the locator signal 22, which is received by the locator device 14. The transmitting device 16 transmits the training signal 20 when the trainer pushes the training device button 26. Similarly, the transmitting device 16 transmits the locator signal 22 when the trainer pushes the locator device button 28. The training signal 20 is distinguishable from the locator signal 22 to the extent that the training device 12 does not respond to the locator signal 22, and the locator device 14 does not respond to the training signal 20. For example, in one embodiment, the training signal 20 is transmitted by the transmitting device 16 at a frequency of 10 kHz, and the locator signal 22 is transmitted by the transmitting device 16 at a frequency of 7 kHz. Accordingly, the training device 12 is adapted to receive a 10 kHz signal, and the locator device 14 is adapted to receive a 7 kHz signal. Consequently, communication between the transmitting device 16 and the training device 12 is independent from communication between the transmitting device 16 and the locator device 14. It should be noted that communication between the transmitting device 16 and the training device 12 that is independent from communication between the transmitting device 16 and the locator device 14 is achievable by ways other than transmitting the training signal 20 and the locator signal 22 at different frequencies without departing from the scope or spirit of the present invention. For example, in an alternative embodiment, the training signal 20 and the locator signal 22 are differentiated by encoding each signal with a distinguishable code. More specifically, as illustrated in the flow diagram of FIG. 4, when either the training device button 26 or the locator device button 28 is pushed, the transmitting device 16 determines which button was pushed, as depicted at 32. When the training device button 26 is pushed, the transmitting device 16 generates a training signal preamble, as depicted at 34. After the training signal preamble is generated, the transmitting device 16 generates the training signal 20, as depicted at 36. Next, the transmitting device 16 transmits the training signal 20 along with its preamble, as depicted at 38. Similarly, when the locator device button 28 is pushed, the transmitting device 16 generates a locator signal preamble, as depicted at 40. After the locator signal preamble is generated, the transmitting device 16 generates the locator signal 22, as depicted at 42. Next, the transmitting device 16 transmits the locator signal 22 along with its preamble, as depicted at 44.

Figure 4:
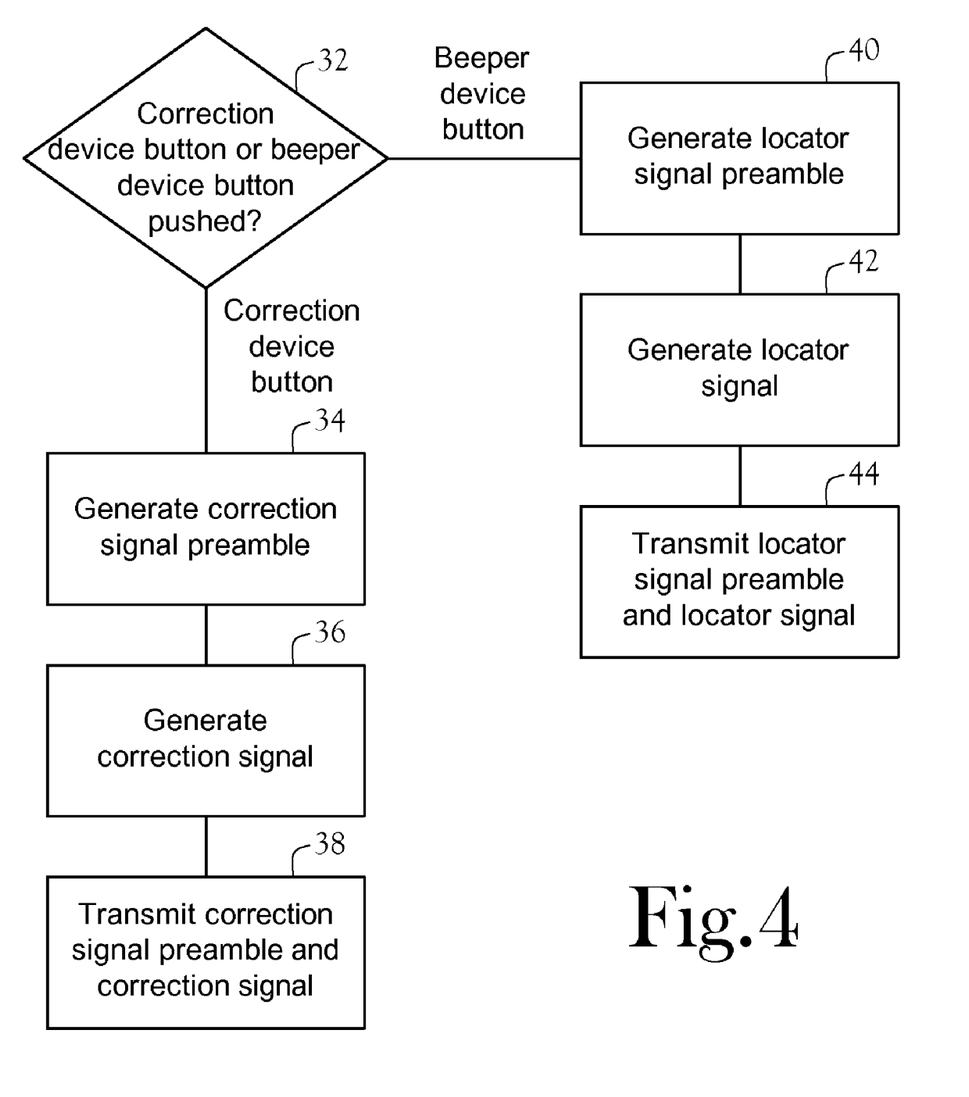
FIG. 4 is a flow diagram illustrating an alternative embodiment of how the transmitting device of the animal training/locating device differentiates the training signal and the locator signal.
Figure 5:
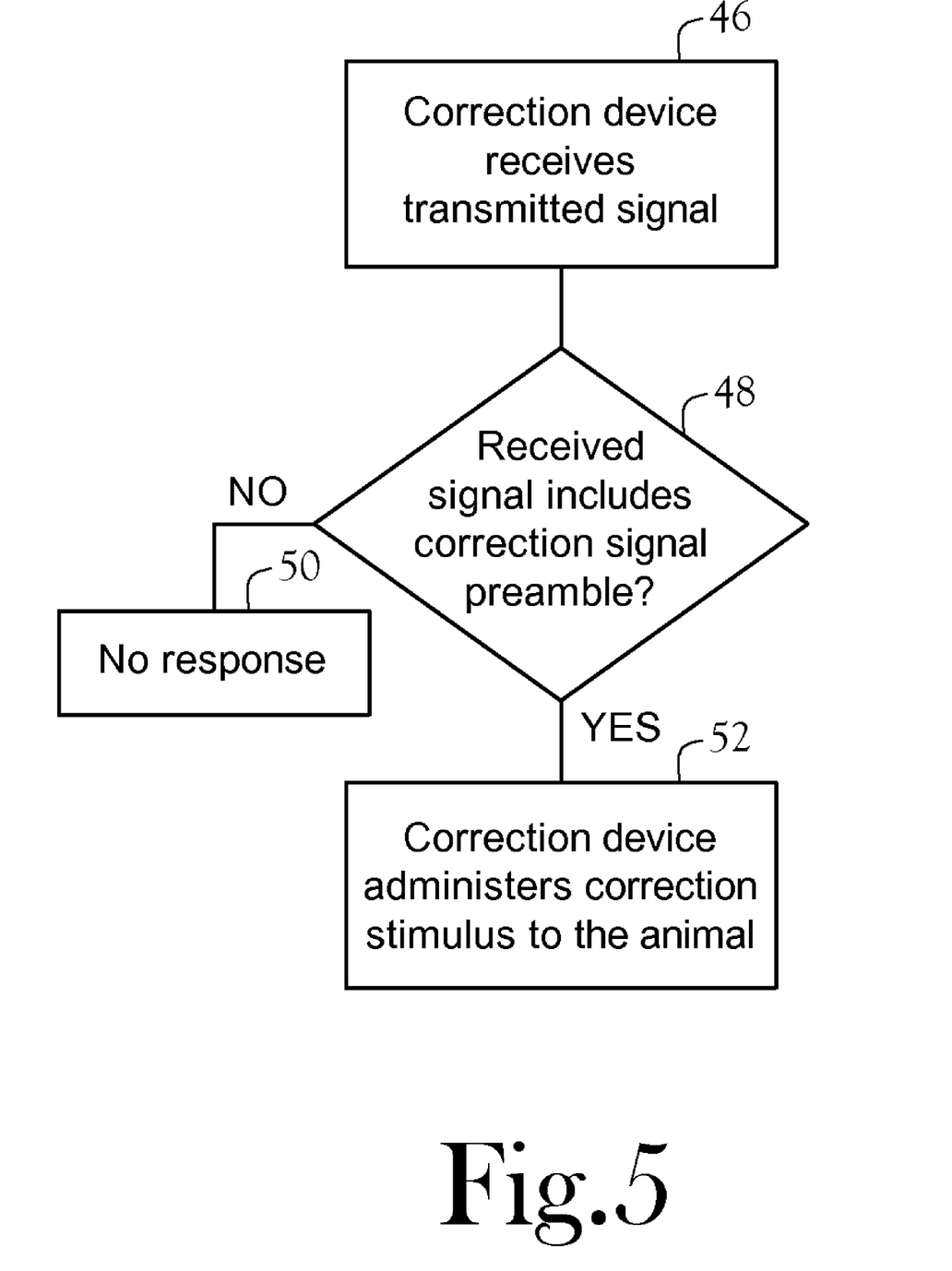
FIG. 5 and FIG. 6 are flow diagrams illustrating an alternative embodiment of how the training device and the locator device differentiate the training signal and the locator signal when transmitted by the transmitting device of FIG. 4.
Figure 6:
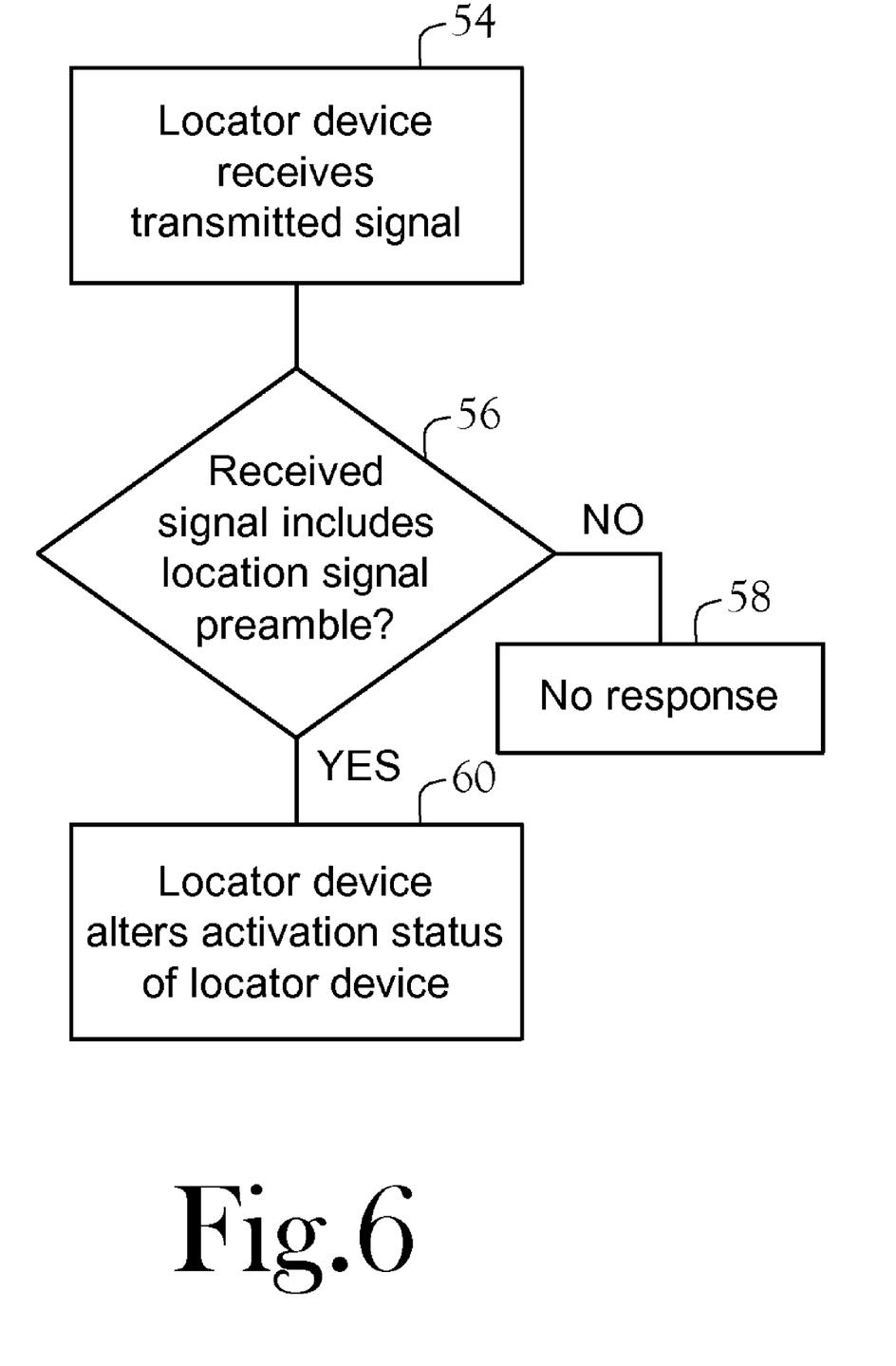

FIG. 5 and FIG. 6 are flow diagrams illustrating how alternative embodiments of the training device 12 and the locator device 14 process a signal transmitted by the embodiment of the transmitting device 16 of FIG. 4. In FIG. 5, when the training device 12 receives the signal transmitted by the transmitting device 16, as depicted at 46, it determines whether the signal contains the training signal preamble, as depicted at 48. If the received signal does not include the training signal preamble, the training device 12 does not respond to the received signal, as depicted at 50. If the received signal includes the training signal preamble, the training device 12 responds accordingly to the received signal, which includes the training signal 20. More specifically, the training device 12 responds by delivering a stimulus to the animal, as depicted at 52. Similarly, in FIG. 6, when the locator device 14 receives the signal transmitted by the transmitting device 16, as depicted at 54, it determines whether the signal contains the locator signal preamble, as depicted at 56. If the received signal does not include the locator signal preamble, the locator device 14 does not respond to the received signal, as depicted at 58. If the received signal includes the locator signal preamble, the locator device 14 responds accordingly to the received signal, which includes the locator signal 22. More specifically, the locator device 14 responds by altering the activation status of the locator device 14, as depicted at 60.

Those skilled in the art will recognize that an encoding scheme other than an encoding scheme utilizing distinguishable preambles can be used without departing from the scope or spirit of the present invention. It should be noted that communication between the transmitting device 16 and the training device 12 that is independent from communication between the transmitting device 16 and the locator device 14 is achievable by ways other than encoding the training signal 20 and the locator signal 22 without departing from the scope or spirit of the present invention.

From the foregoing description, those skilled in the art will recognize that a device for training and locating an animal offering advantages over the prior art has been provided. The device provides an animal training device and an animal locator device. Further, the device provides for independent communication between the trainer and the training device and between the trainer and the locator device.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. An animal training/locating device for training and locating an animal, said animal training/locating device comprising:

a transmitting device that transmits a training signal and a locator signal, said transmitting device transmits the training signal at a first frequency and transmits the locator signal at a second frequency, the first frequency being 10 kHz and the second frequency being 7 kHz;

a training device adapted to be carried by the animal, said training device delivers a stimulus to the animal, said training device receives the training signal transmitted by said transmitting device and is responsive thereto; and a locator device adapted to be carried by the animal, said locator device transmits a position indicating signal, said locator device receives the locator signal transmitted by said transmitting device and is responsive thereto.

2. An animal training/locating device for training and locating an animal, said animal training/locating device comprising:

a transmitting device that transmits a training signal and a locator signal, said transmitting device transmits the training signal at a first frequency and transmits the locator signal at a second frequency, the first frequency being 7 kHz and the second frequency being 10 kHz;

a training device adapted to be carried by the animal, said training device delivers a stimulus to the animal, said training device receives the training signal transmitted by said transmitting device and is responsive thereto; and a locator device adapted to be carried by the animal, said locator device transmits a position indicating signal, said locator device receives the locator signal transmitted by said transmitting device and is responsive thereto.

3. An animal training/locating device for training and locating an animal, said animal training/locating device comprising:

a transmitting device that transmits a training signal and a locator signal, the training signal being distinguishable from the locator signal;

a training device adapted to be carried by the animal, said training device delivers a stimulus to the animal, said training device being responsive to the training signal transmitted by said transmitting device; and a locator device adapted to be carried by the animal, said locator device transmits a position indicating signal, said locator device alters the activation status of said locator device in response to receiving the locator signal.

4. An animal training/locating device for training and locating an animal, said animal training/locating device comprising:

a transmitting device that transmits a training signal and a locator signal, the training signal being distinguishable from the locator signal;

a training device adapted to be carried by the animal, said training device delivers a stimulus to the animal, said training device being responsive to the training signal transmitted by said transmitting device; and a locator device adapted to be carried by the animal, said locator device transmits a position indicating signal, said locator device alters the type of the position indicating signal in response to receiving the locator signal.

5. An animal training/locating device for training and locating an animal, said animal training/locating device comprising:

a transmitting device;

a training device in wireless communication with said transmitting device, said training device being adapted to be carried by the animal, said training device delivers a stimulus to the animal; and a locator device in wireless communication with said transmitting device, said locator device being adapted to be carried by the animal, said locator device transmitting a position indicating signal, said locator device responds to communication with said transmitting device by altering the activation status of the locator device;

whereby communication between said transmitting device and said training device is conducted independently from communication between said transmitting device and said location device.

6. An animal training/locating device for training and locating an animal, said animal training/locating device comprising:

a transmitting device;

a training device in wireless communication with said transmitting device, said training device being adapted to be carried by the animal, said training device delivers a stimulus to the animal; and a locator device in wireless communication with said transmitting device, said locator device being adapted to be carried by the animal, said locator device transmitting a position indicating signal, said locator device responds to communication with said transmitting device by altering the type of the position indicating signal of the locator device;

whereby communication between said transmitting device and said training device is conducted independently from communication between said transmitting device and said location device.

* * * * *

UNITED STATES PATENT AND TRADEMARK OFFICE
CERTIFICATE OF CORRECTION

| | | |
|---|---|---|
| PATENT NO. | : 7,814,865 B2 | Page 1 of 1 |
| APPLICATION NO. | : 11/669914 | |
| DATED | : October 19, 2010 | |
| INVENTOR(S) | : Lance Tracey and Greg Gillis | |

It is certified that error appears in the above-identified patent and that said Letters Patent is hereby corrected as shown below:

On the title page, at item (73), amend the Assignee information to read --Radio Systems Corporation, Knoxville, TN (US)--.

Signed and Sealed this
Fourth Day of January, 2011

David J. Kappos
*Director of the United States Patent and Trademark Office*